Jan. 16, 1962  H. R. HOY ET AL  3,016,566

GRANULATION OF MOLTEN MATERIAL

Filed Oct. 26, 1959  3 Sheets-Sheet 1

FIG. I.

INVENTORS
H. R. HOY
D. M. WILKINS
BY  R. L. JOHNSON

Holcombe, Wetherill & Brisebois
ATTORNEY

Jan. 16, 1962 H. R. HOY ET AL 3,016,566
GRANULATION OF MOLTEN MATERIAL
Filed Oct. 26, 1959 3 Sheets-Sheet 2

INVENTORS
H. R. HOY
D. M. WILKINS
BY R. L. JOHNSON

Holcombe, Wetherill + Brisebois
ATTORNEY

INVENTORS
H. R. HOY
D. M. WILKINS
R. L. JOHNSON
BY
Holcombe, Wetherill + Brisebois
ATTORNEY 3,016,566
GRANULATION OF MOLTEN MATERIAL
Herbert Raymond Hoy, Fetcham, Dennis Malcolm Wilkins, Carshalton, and Ronald Leslie Johnson, New Malden, England, assignors to C.U.R.A. Patents Limited, Leatherhead, Surrey, England
Filed Oct. 26, 1959, Ser. No. 848,744
Claims priority, application Great Britain Oct. 31, 1958
3 Claims. (Cl. 18—2.4)

This invention relates to the granulation of molten material, especially either slag or mineral matter discharged as a liquid from processing involving the gasification or combustion of carbonaceous fuels.

It has previously been proposed to granulate molten material by allowing a stream of the material to fall into a coolant liquid, usually water, but the heat contained in the molten material may cause the coolant liquid to boil in the region where the stream of molten material meets it and this can lead to the formation of solid granules that contain pockets of the coolant vapour and so float on the surface of the coolant liquid. The stream of molten material may then fall on these particles and tend to solidify on them so that large bodies of the solid material are formed instead of the desired small granules. This trouble is especially likely to occur when, in order to enable as much as possible of the heat transferred to the coolant liquid from the molten material to be usefully recovered, the coolant liquid is maintained at a high temperature not very far below the boiling point of the liquid. In order to overcome this difficulty, it has been proposed to allow the stream of molten material to fall into a continuously moving stream of a coolant liquid so that the coolant in the region of entry of the stream of molten material is continuously replaced by fresh coolant, and the granules formed are carried away out of the path of the molten stream. Even when this is done, however, the apparatus tends to get blocked from time to time as a result, for example, of a part of the solidified material adhering to the walls of the trough through which the coolant stream flows.

This invention provides apparatus for granulating molten material, which comprises a trough for carrying a stream of coolant liquid and mounted so as to be retractable longitudinally in one direction, means for discharging the molten material into the trough under gravity from above, and means for dislodging solidified material adhering to the interior surface of the trough, the dislodging means being spaced from the discharging means in the direction of retraction of the trough and the arrangement being such that retraction of the trough causes the dislodging means to operate by causing relative longitudinal movement between the trough and the dislodging means.

In operation, the coolant liquid flows against the direction of retraction of the trough so that solidified material freed by the dislodging means is removed by the stream of coolant liquid.

The discharging means may be an outlet in a vessel for containing the molten material (the vessel may be, for example, a reaction vessel in which the molten material is to be formed). Hanging masses of solidified material, which are commonly referred to as beards, tend to adhere to the outside of the vessel in the region of the outlet and, advantageously, there is provided means for removing such solidified material. The removing means advantageously comprises a member mounted so as to be movable horizontally to and fro close beneath the outlet, means for scraping the movable member and liquid-cooling means for cooling the scraping means. In operation, the horizontally movable member is normally maintained in a withdrawn position in which it is clear of the stream of molten material issuing from the discharging means and from which it can be moved across beneath the discharging means in order to remove any beards that may have formed. Advantageously there is provided driving means for the horizontally movable member. The driving means should be arranged to give rapid movement of the member and is preferably hydraulic or pneumatic, but it may be mechanical or electrical. The removing means preferably also comprises a torch for melting the solidified material.

Advantageously, the base of the trough directly below the discharging means is, when the trough is in its operative position, within the range of from 10 to 20 inches below the discharging means. The fact that the stream of molten material falls through only this relatively short distance reduces the risk of molten material falling on to the side edges of the trough and also enables the apparatus to be compact.

Advantageously, there is provided driving means for retracting and advancing the trough. The driving means should be arranged to move the trough rapidly and is preferably either hydraulic or pneumatic, but it may be mechanical or electrical.

Advantageously, there is provided an additional retractable trough which, in its operative position, is situated directly beneath the discharging means, and additional dislodging means associated with the additional trough, the arrangement being such that, when one trough is retracted, the other trough can be advanced to its operative position. Preferably, there are provided means for supplying a stream of coolant liquid to the first-mentioned trough and for removing solidified material from the stream after it has passed through the trough, and separate means for supplying a stream of coolant liquid to the additional trough and for removing solidified material from the latter stream after it has passed through the additional trough. This makes it possible to continue operation of the apparatus even if one of the troughs, or the associated means for supplying a stream of coolant liquid to the trough and for removing solidified material from the stream after it has passed through the trough, is put out of use. Advantageously, each trough is movable to a withdrawn position, which is situated beyond the retracted position of the trough and from which the trough can be removed from the apparatus, and there is provided means for isolating the trough in its withdrawn position from the rest of the apparatus to enable the trough to be removed without interrupting the operation of the apparatus. The troughs may be mounted one above the other, but advantageously they are mounted at the same level as one another and there is provided driving means (preferably hydraulic or pneumatic) for retracting and advancing the troughs, the driving means being arranged so that, after retracting either of the troughs, the driving means advances the other trough to its operative position.

The or each trough may be retracted, with the purpose of dislodging any solidified material that may be adhering to it, and the beard-removing means may be operated, either after a given period of operation of the apparatus or when observation indicates that such solidified material has accumulated or that beards have formed. There may be provided an opening or window in the wall of the apparatus to enable the conditions in the or each trough and/or in the region of the discharging means to be observed visually. Advantageously, there is provided a television camera arranged to give an indication of the presence of solidified material adhering to the trough and/or in the region of the discharging means. The television camera may be so arranged as to enable an operator to observe whether or not solidified material is accumulating in the apparatus. Either instead of or in addition to the television camera, there may be provided a light source and a photoelectric device so arranged that an accumulation of solidified material interrupts a beam of light falling on the photoelectric device from the light source and thereby causes the photoelectric device to give an indication. The television camera and/or the photoelectric device is or are preferably arranged to cause the driving means for retracting and advancing the or each trough to operate automatically in the event of solidified material accumulating in the trough and/or to cause the removing means to operate automatically in the event of beards forming.

The television camera and/or the photoelectric device may also be arranged to control factors, for example, the temperature and viscosity of the molten material immediately before it is discharged, that can influence the accumulation of solidified material within the apparatus.

The driving means for retracting the or each trough and the driving means for the removing means may be operable separately or they may be interconnected so that, for example, the removing means can be operated only when no trough is in its operative position or the removing means is operated automatically when the or each trough is retracted.

Advantageously, the or each trough is inclined upwardly in the direction of retraction.

Preferably, the or each dislodging means is fixed. The relative movement between the dislodging means and the trough with which it is associated is then produced solely by the retraction of the trough. The or each dislodging means may comprise a plurality of vertically extending members arranged to terminate at their lower ends close above the adjacent part of the base of the trough. Advantageously, the vertically extending members are vanes arranged to serve as guides to reduce or eliminate turbulence in the stream of coolant liquid flowing in the trough. Preferably, in addition to such vertically extending members, the or each dislodging means also comprises members that pass over the side edges of the associated trough to dislodge solidified material adhering to the side edges.

The or each trough may be of rectangular, semicircular or U-shaped cross-section. Advantageously, the or each trough is slidably mounted at its upstream end within the lower part of an inlet pipe for the liquid coolant, a seal is provided between the outer surface of the trough and the inner surface of the inlet pipe and, when the trough is in its operative position, the downstream end of the trough extends within the open end of an outlet pipe for the liquid coolant and granulated material. Preferably, in order to cause turbulence for the purpose of breaking up any large agglomerates of solidified material that may be formed, the outlet pipe is stepped downwardly.

For satisfactory granulation, the velocity of the coolant liquid in the trough should normally be within the range of from 5 to 20 feet per second, and there may be provided pump means for circulating coolant liquid from the outlet pipe to the inlet pipe and separating means situated between the outlet pipe and the pump means for removing granulated material from the coolant liquid. The separating means may comprise, for example, a screen for removing the coarser material followed by a cyclone for removing the finer material. Coolant liquid has to be added to the circulating system and, when the outlet pipe is stepped downwardly, there is advantageously provided an inlet for introducing coolant liquid into the downwardly stepped portion of the outlet pipe, the inlet being so positioned that the introduction of coolant liquid through the inlet creates turbulence within the steeply inclined section of the stepped portion.

Advantageously, there is provided deflector means arranged to deflect coolant liquid flowing in the upper part of the inlet pipe downwardly to below the level of the edges of the trough. The deflector means also serves to increase the velocity of the coolant liquid flowing through the trough.

Advantageously, there is provided, below the or each trough and directly beneath the discharging means, means for receiving solidified or molten material that falls from the discharging means when the or each trough is retracted. Preferably, the receiving means is a reservoir, open at the top, for coolant liquid. A lock or other form of pressure-sealing device may be provided for the removal of solidified material from the reservoir, and crushing means may be provided for crushing both this material and coarse material removed by the separating means.

Because solidified material can be removed from the or each trough without interrupting the operation of the apparatus, the apparatus, especially the form having an additional trough, is very suitable for use when the molten material is formed under pressure because a shutdown of the plant is then usually extremely inconvenient and expensive.

Two forms of apparatus for granulating molten material and constructed in accordance with the invention will now be described by way of example in greater detail with reference to the accompanying drawings in which.

Figure 1:
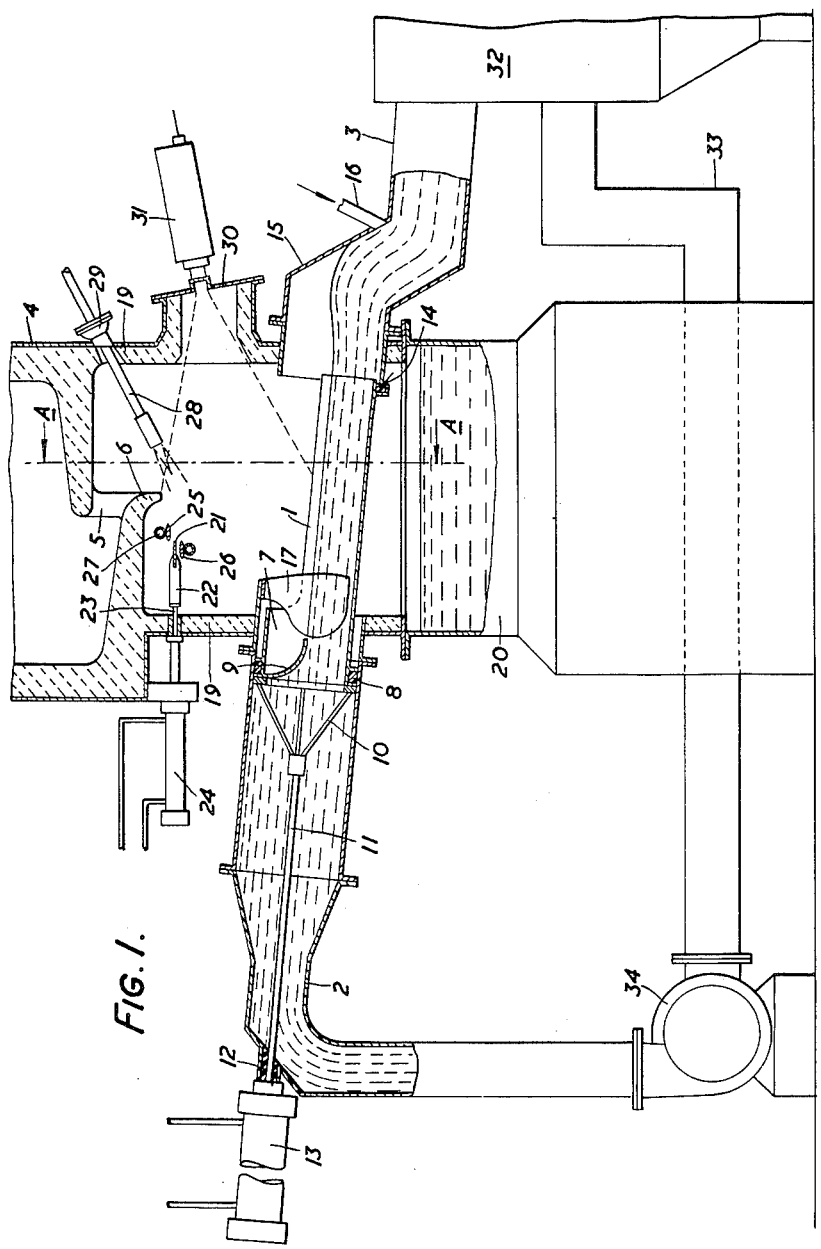
FIG. 1 is a vertical section of one form of apparatus.
Figure 2:
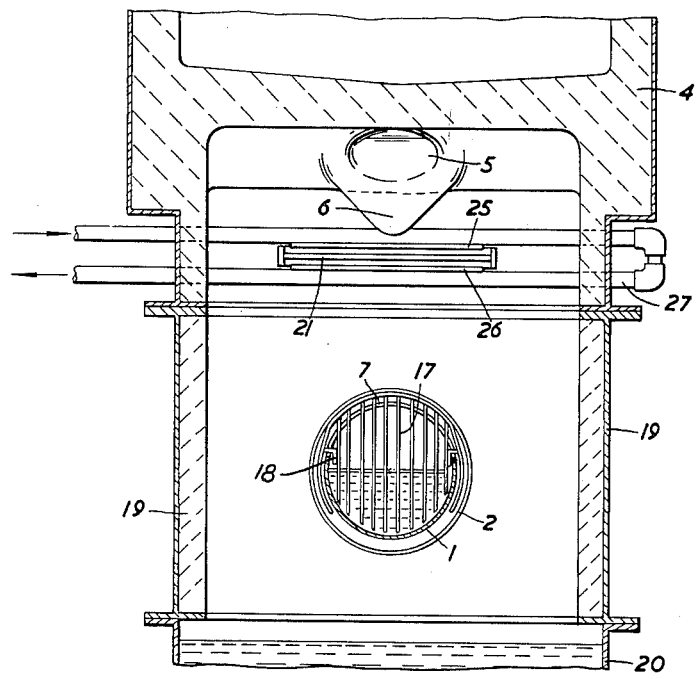
FIG. 2 is a section on the line A—A of FIG. 1.

Referring to FIGS. 1 and 2 of the drawings, one form of apparatus comprises a longitudinally inclined trough 1 of semi-circular cross-section for carrying a stream of water flowing in the direction of downward inclination of the trough 1, and inlet pipe 2 for supplying water to the trough 1, an outlet pipe 3 for the stream of water leaving the trough and a reaction vessel 4 situated above the trough 1 and having an opening 5 from which molten material can fall in a stream over a lip 6 into the trough 1.

The upper end portion of the trough 1 extends within the inlet pipe 2 and the walls of this end portion of the trough 1 continue upwards to form a tube 7 of circular section. Between the outer surface of the tube 7 and the inner surface of the inlet pipe 2, there is a gland 8 which forms a seal between the tube 7 and the inlet pipe 2 while at the same time allowing the trough 1 to slide axially within the inlet pipe 2. At its upper end, the upper part of the tube 7 is closed by a curved deflector plate 9, which ensures that water flowing in the upper half of the inlet pipe 2 is deflected downwardly so that it does not spill over the edges of the trough 1. The deflector plate 9 also serves to increase the velocity of the water flowing through the trough 1.

The upper end of the trough 1 is secured by means of a spider 10 to a rod 11, which is coaxial with the trough. The rod 11 passes through the wall of the inlet pipe 2 at a bend of the pipe. A gland 12 provides a seal between the rod 11 and the wall of the inlet pipe 2, and allows the rod 11 to move axially for retraction of the trough 1. The end of the rod 11 remote from the trough 1 carries a piston which is slidable within a cylinder 13 to which compressed air can be supplied at either end for moving the trough 1. This arrangement allows the trough 1 to be retracted or advanced to its operative position rapidly.

When the trough 1 is in its operative position it extends at its lower end just within the open end of the outlet pipe 3, and a seal 14 is provided to prevent water from leaking between the underside of the trough 1 and the inner surface of the outlet pipe 3. A short distance from its upper end, the outlet pipe 3 is stepped downwardly to form a steeply inclined section 15. An inlet tube 16 is provided for introducing additional water into the outlet pipe 3 at the lower end of the steeply inclined section 15. The introduction of this additional water serves both to increase the turbulence in the steeply inclined section 15 and to sweep the part of the inner surface of that section which faces towards the trough 1.

Depending vertically from the upper part of the lower end of the inlet pipe 2 immediately downstream of the tube 7 formed at the upper end of the trough 1, are ten vanes 17 which terminate close above the bottom of the trough 1 and lie in planes that extend parallel to the axis of the trough 1. On the downstream side, the edge of each of the vanes 17 is approximately vertical, but, on the upstream side, the lower part of each of the vanes 17 is convex so that the vanes 17 are widest over a region just below the top of the trough 1. When the trough 1 is in its operative position, these vanes 17 serve as flow-straighteners, that is to say, they promote stream-lined flow of the water and so reduce or eliminate any tendency that the water may have to splash over the sides of the trough 1. When the trough is retracted, the vanes 17, together with two associated members 18, which are also secured to the inlet pipe 2 and which pass horizontally close over the side edges of the trough 1 and then turn downwardly within the trough 1, serve to dislodge solidified material adhering to the inside and the edges of the trough 1. The lower end of the inlet pipe 2 and the upper end of the outlet pipe 3 extend a short distance through vertical side walls 19, which form a downward extension of the side walls of the reaction vessel 4. Below the trough 1, the side walls 19 are joined to the side walls of a reservoir 20, which is open at the top to receive molten or solidified material that falls while the trough 1 is retracted. The base of the reaction vessel 4 is situated at a height of about 15 inches above the base of the trough 1 directly beneath, and the reaction vessel 4, the reservoir 20 and the space enclosed by the side walls 19 together form a closed system.

Close beneath the level of the lower extremity of the lip 6, there is a bar 21, which is mounted in a holder 22 that is secured to one end of a rod 23. The rod 23 passes through a gland in the side wall 19 and carries a piston which is slidable in a cylinder 24 secured to the underside of the reaction vessel 4. Compressed air can be admitted to either end of the cylinder 24 for moving the bar 21 between a position in which it lies away from the outlet 5 and a position behind and beneath the decurved lip 6. Between these two positions, the bar 21 passes between two scrapers 25 and 26, which are situated respectively above and below the bar 21 and are secured to a fixed water-cooling pipe 27 which passes out through seals (not shown) in the side walls 19.

Opposite and slightly above the bar 21, a gas burner torch 28 passes through the side wall 19 and is mounted in a universal joint 29, which also serves as a seal. Thus the torch 28 can be moved in order to vary the point of application of its flame.

Directly beneath the torch 28, a window 30 is formed in the side wall 19, and a television camera 31 is arranged to receive light passing through the window 30 and thus to give an indication of the conditions prevailing in the trough 1 and at the lip 6. These conditions can be viewed on a cathode ray screen, but the output from the television camera 31 can also be arranged to control the supply of compressed air to the cylinders 13 and 24 and thus to provide automatic control of the retraction of the trough and of the movement of the bar 21. The output from the television camera 31 varies in response to an accumulation of solidified material because this causes a variation in the pattern of luminous intensity over its field of view as a result of changes in the shape and brightness of the stream of molten material falling from the outlet 5 to the trough 1. The output from the television camera 31 may also control the operation of the torch 28.

The outlet pipe 3 leads to a screen (which has been omitted from the drawings in the interests of clarity) and then to a cyclone 32. From the cyclone, a pipe 33 leads to a pump 34, the outlet of which is connected to the inlet pipe 2.

The apparatus operates in the following way. The pump 34 circulates water to the inlet pipe 2 so that the water flows down the trough at a velocity within the range of from 5 to 20 feet per second. In order to make up for losses, additional water is introduced into the system through the inlet 16 and this imparts additional turbulence to the water flowing in the steeply inclined section 15 of the outlet pipe 3.

Molten material formed in the reaction vessel 4 passes through the outlet 5 and falls in a stream over the lip 6 and into the water flowing in the trough 1. The water quenches the molten material so that it solidifies and shatters into granules. Accordingly, during normal operation, comparatively few large particles reach the screen.

The interior of the trough 1 and the lip 6 are observed from time to time on the cathode ray screen to see whether solidified material is adhering to the trough 1 or beards are forming on the lip 6.

If solidified material is found to be adhering to the trough 1, compressed air is supplied to one end of the cylinder 13 to retract the trough 1 either by an operator or automatically in accordance with the output from the television camera 31. The resulting relative movement between the fixed vanes 17 and the members 18 on the one hand and the trough 1 on the other hand serves to dislodge any solidified material adhering to the trough 1. Even when the trough 1 is fully retracted, the momentum of the water is such that the bulk of it enters the outlet pipe 3 and the stream of water passing across the gap between the inlet pipe 2 and the outlet pipe 3 continues to quench and granulate the molten material in much the same way as when the trough 1 is in its operative position, but the efficiency is reduced and the solidified material, instead of passing into the outlet pipe 3, falls into the reservoir 20. Thus the trough 1 is normally advanced to its operative position again as soon as possible by applying compressed air to the other end of the cylinder 13.

If beards are found to be present, the torch 28 is brought into operation in order to soften the beards where they are adhering to the lip 6 and then compressed air is applied to one end of the cylinder 24 to advance the bar 21 and so chop the beard off. The bar 21 is then immediately retracted by applying compressed air to the other end of the cylinder 24, when the water-cooled scrapers 25 and 26 serve both to cool the bar 21 and to remove from it any solidified material that may be adhering to it. The torch 28 and bar 21 may be actuated by an operator in response to what is shown on the cathode ray screen or automatically in accordance with the output from the television camera 31. It is usually preferable to operate the bar 21 when the trough 1 is retracted so that the beards dislodged by the bar 21 and any solidified material removed from the bar 21 by the scrapers 25 and 26 fall through into the reservoir 20 rather than entering the trough 1 or the outlet pipe 3, where they might cause damage or blockage.

The granulated material which passes through the screen (not shown) is separated by the cyclone 32 so that the water passing along the pipe 33 to the pump 34 is substantially free from suspended solidified material. The coarse material collected by the screen, together with the solidified material from the reservoir 20, is passed to a crusher (not shown) and the crushed material, together with the granules separated by the cyclone 32, pass out through a common pressure lock (not shown).

Figure 3:
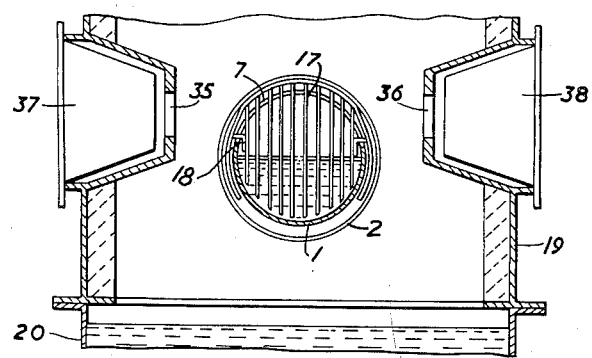
FIG. 3 is a fragmentary vertical section on the line A—A of FIG. 1 and shows a modification.

If desired, the cyclone 32 may be replaced by a fine screen. Referring to FIG. 3 of the drawings, the apparatus shown in FIGS. 1 and 2 of the drawings may be modified by providing windows 35 and 36 in the side wall 19 opposite to one another and just above the level of the top of the trough 1. Behind the window 35, there is situated a light source 37 and, behind the window 36, a photoelectric cell 38 is mounted to receive a light beam from the light source 37. If solidified material builds up in the trough 1, the beam is interrupted and the consequent change in the output of the photoelectric cell 38 may be used either to give an indication to an operator or to retract the trough 1 automatically. Thus the television camera 31 may be retained to provide a visual indication for an operator and the photoelectric cell 38 may be used to provide the automatic retraction of the trough 1. Alternatively, the television camera 31 may be dispensed with and a similar arrangement of a light source and photoelectric cell may be used to give an indication of the formation of beards on the lip 6 and/or to operate the bar 21 automatically.

Figure 4:
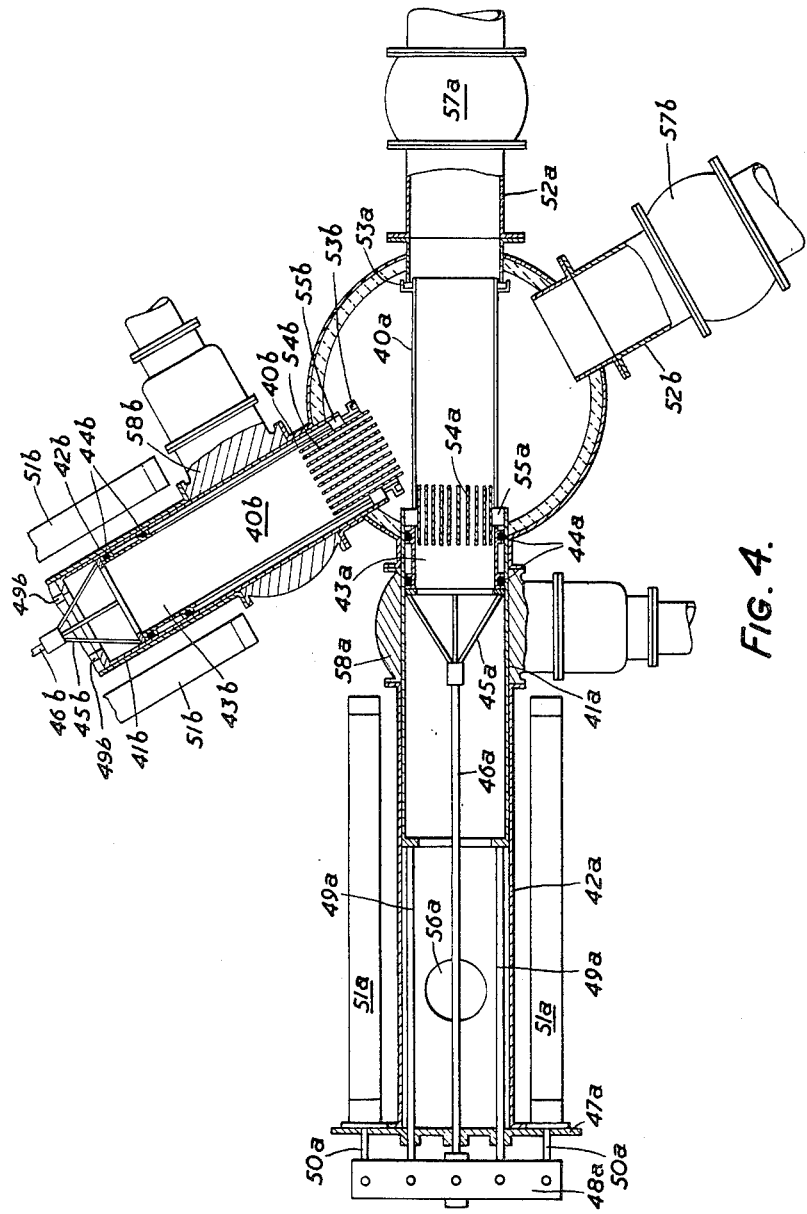
FIG. 4 is a horizontal section of a second form of apparatus.

Referring to FIG. 4 of the drawings, the second form of apparatus is similar to that shown in FIGS. 1 and 2 except in that the trough 1 is replaced by two retractable troughs 40a and 40b, each of which can be completely removed from the apparatus and has its own inlet and outlet pipes and associated equipment.

As the two troughs 40a and 40b and the two sets of inlet and outlet pipes are exactly similar to one another, only one trough 40a and its associated inlet and outlet pipes will be described in detail. Corresponding parts of the two systems are indicated by the same reference numerals and are distinguished by the use of the suffix a for the parts of the system described in detail and the suffix b for the parts of the other system.

The trough 40a is inclined downwardly and the upper end of the trough 40a extends within the open end of an inner sleeve 41a which is itself mounted within an outer sleeve 42a. The walls of the upper end portion of the trough 40a continue upwards to form a tube 43a of circular section. Between the outer surface of the tube 43a and the inner surface of the inner sleeve 41a, there are two glands 44a which form a seal while at the same time allowing the trough 40a to slide axially within the inner sleeve 41a. The upper part of the tube 43a is closed by a curved deflector plate (not shown), which is exactly similar to the plate 9 shown in FIG. 1.

The upper end of the trough 40a is secured by means of a spider 45a to a rod 46a which passes through a plate 47a that closes the end of the outer sleeve 42a remote from the trough 40a. Beyond the plate 47a, the rod 46a is releasably secured to a cross-head 48a. Also releasably secured to the cross-head 48a are two rods 49a, which are secured to the inner sleeve 41a, and two piston rods 50a, which carry pistons slidable within cylinders 51a. Compressed air can be supplied to either end of the cylinders 51a for advancing and retracting either the trough 40a alone or the trough 40a and the inner sleeve 41a together.

When the trough 40a is in its operative position, it extends at its lower end just within the open end of an outlet pipe 52a, and a seal 53a is provided to prevent water from leaking between the underside of the trough 40a and the inner surface of the outlet pipe 52a.

Depending vertically from the upper part of the lower end of the inner sleeve 41a immediately downstream of the tube 43a formed at the upper end of the trough 40a are ten vanes 54a, which are shaped and arranged to operate in exactly the same manner as the vanes 17 shown in FIG. 1. Also secured to the lower end of the inner sleeve 41a are two members 55a, which pass over the side edges of the trough 40a and are exactly similar to the members 18 shown in FIGS. 2 and 3.

The inlet pipe (not shown) leads to an inlet opening 56a formed in the underside of the outer sleeve 42a and is fitted with an isolating valve (not shown) to enable the supply of water to the inlet opening 56a to be cut off. Similarly, the outlet pipe 52a is fitted with an isolating valve 57a. A third isolating valve 58a is provided at the lower end of the outer sleeve 42a.

The outlet pipe 52a leads to a screen for coarse solidified material and thence, via a cyclone or finer screen to a pump which recirculates the water to the inlet pipe. This system, which is not shown, is similar to the corresponding part of the apparatus described with reference to FIGS. 1 and 2. A similar and entirely separate system is provided for the retractable trough 40b.

In operation, the rods 49a are normally disconnected from the cross-head 48a and the apparatus then operates in the same way as that described with reference to FIGS. 1 and 2 except that, when the trough 40a is retracted (to a position corresponding to that occupied by the trough 40b in FIG. 4), the trough 40b may, if for any reason it is desired, be advanced in its place after the isolating valve on the associated inlet pipe (not shown) and the isolating valve 57b have been opened. If it is then desired to withdraw the trough 40a completely for inspection and possible repair or replacement, this can be done by closing the isolating valve on the associated inlet pipe (not shown) and the isolating valve 57a, disconnecting the rod 46a from the cross-head 48a, returning the cross-head 48a to the position shown in FIG. 4, connecting the rods 49a to the cross-head 48a and reconnecting the rod 46a to the cross-head 48a, and then withdrawing the trough 40a and the inner sleeve 41a until the outer end of the inner sleeve 41a abuts the plate 47a. The isolating valve 58a can then be closed and the plate 47a removed to allow the trough 40a to be removed.

We claim:
1. Apparatus for granulating molten material which comprises a vessel for containing the molten material, discharging means for discharging molten material, from said vessel under gravity, two axially moveable troughs, each for carrying a stream of coolant liquid and mounted for alternate advancement from an inoperative position to an operative position directly beneath said discharging means, two fixed dislodging means, associated one with each trough, spaced from said discharging means in the direction of retraction of the trough and arranged to extend within said trough during retraction thereof to dislodge solidified material adhering to the interior surface of the trough, a reservoir for coolant liquid open at the top, situated below said troughs in their operative positions and directly below the discharging means, for receiving solidified material falling from said discharging means when both troughs are in their inoperative positions, and a jacket extending between said vessel and said reservoir and arranged to form a gas-tight region enclosing the troughs, the discharging means and the dislodging means.

2. Apparatus for granulating molten material, which comprises discharging means for discharging molten material under gravity, two movable troughs, each for carrying a stream of coolant liquid and mounted for alternate advancement of the troughs from inoperative positions to operative positions directly beneath the discharging means, driving means for advancing and retracting each of said troughs in alternate relation, coolant liquid supplying means for supplying a stream of coolant liquid to one trough and separating means for separating granulated material from said stream after it has passed through said trough and separate coolant liquid supplying means for supplying a stream of coolant liquid to the other trough and separate separating means for separating granulated material from said stream after it has passed through said other trough and two fixed dislodging means, associated one with each trough, each spaced from the discharging means in the direction of retraction of the associated trough and arranged to extend within the associated trough during retraction thereof to remove solidified material adhering to the interior of the associated trough.

3. Apparatus for granulating molten material which comprises a vessel for containing the molten material, discharging means for discharging the molten material under gravity, two axially movable troughs, each for carrying a stream of coolant liquid and mounted for alternate advancement of the troughs from an inoperative position to an operative position directly beneath the discharging means, two fixed dislodging means, associated one with each trough, spaced from the discharging means in the directions of retraction of the associated troughs and arranged to extend within said troughs during retraction thereof to dislodge solidified material adhering to the interior surfaces of said troughs, a reservoir for coolant liquid, open at its top, and situated below said troughs in their operative positions and directly below the discharging means, for receiving solidified material falling from said discharging means when both of said troughs are in their inoperative positions, and a jacket extending between said vessel and said reservoir, and arranged to form a gas-tight region enclosing the troughs, the discharging means and the dislodging means, and wherein each trough is retractable to a withdrawn position situated beyond the retracted position of each trough, from which withdrawn positions each trough can be removed from the apparatus, and isolating means for isolating each trough, when in its withdrawn position, from the gas-tight region to enable said troughs to be removed from the apparatus without interrupting the operation thereof.

References Cited in the file of this patent

UNITED STATES PATENTS

| | | |
|---|---|---|
| 421,620 | Schulze-Berge | Feb. 18, 1890 |
| 801,252 | Koller | Oct. 10, 1905 |
| 1,117,644 | Donaldson | Nov. 17, 1914 |
| 1,241,436 | Peterson | Sept. 25, 1917 |
| 1,460,888 | Cook | July 3, 1923 |
| 1,699,575 | Spies | Jan. 22, 1929 |
| 2,000,484 | James | May 7, 1935 |
| 2,210,999 | Bartholomew | Aug. 13, 1940 |
| 2,391,516 | Richards et al. | Dec. 25, 1945 |
| 2,672,327 | Oury | Mar. 16, 1954 |
| 2,743,492 | Easton | May 1, 1956 |
| 2,968,382 | Oury | Jan. 17, 1961 |